United States Patent [19]

Hirai et al.

[11] Patent Number: 5,568,244
[45] Date of Patent: Oct. 22, 1996

[54] IMAGE FORMING APPARATUS INCLUDING AN ENDLESS TRANSFER MEMBER

[75] Inventors: Atsuto Hirai, Ikoma; Masahide Ueda, Takatsuki; Yoshihisa Terasaka, Suita; Eiichi Sano; Masahiko Matsuura, both of Takatsuki; Hiroyuki Yamasaki, Amagasaki; Masami Yamada, Osaka; Tomoo Izumi, Amagasaki, all of Japan

[73] Assignee: Minolta Co., Ltd., Osaka, Japan

[21] Appl. No.: 355,289

[22] Filed: Dec. 12, 1994

[30] Foreign Application Priority Data

Dec. 13, 1993 [JP] Japan ..................... 5-311660

[51] Int. Cl.$^6$ .................................... G03G 21/00
[52] U.S. Cl. .................. 355/309; 271/193; 355/274; 355/317
[58] Field of Search .................. 355/271, 317, 355/273–276, 308, 309; 271/193, 275

[56] References Cited

U.S. PATENT DOCUMENTS

| 4,697,920 | 10/1987 | Palm et al. ........................ 355/327 |
| 5,368,289 | 11/1994 | Iwaki et al. ...................... 355/309 X |

FOREIGN PATENT DOCUMENTS 2-178680  7/1990  Japan.

Primary Examiner—William J. Royer
Attorney, Agent, or Firm—Burns, Doane, Swecker & Mathis, LLP

[57] ABSTRACT

An image forming apparatus for forming an image onto a sheet includes a sheet supporting member; a charger which is positioned in a vicinity of the sheet supporting member; and a device for controlling the charger so that the charger charges a specific portion of the sheet supporting member corresponding to a leading edge portion of the sheet to an electrostatic potential higher than that of a remaining portion of the sheet supporting member. A method of adhering a sheet to a sheet supporting member during an image forming process includes charging a specific portion of the sheet supporting member corresponding to a leading edge portion of the sheet to a first electrostatic potential; charging a remaining portion of the sheet supporting member to a second electrostatic potential that is lower than the first electrostatic potential; and delivering the sheet to the sheet supporting member so that a leading edge portion of the sheet is aligned with the specific portion of the sheet supporting member.

42 Claims, 9 Drawing Sheets

IMAGE FORMING APPARATUS INCLUDING AN ENDLESS TRANSFER MEMBER

BACKGROUND OF THE INVENTION

1. Field of the Invention

The present invention relates to an image forming apparatus for forming an image on a sheet. More specifically, the present invention relates to an image forming apparatus provided with an endless transfer member.

2. Description of the Related Art

Conventional image forming apparatus are known to be provided with an endless transfer member such as an endless type transfer belt, cylindrical transfer drum or the like. A sheet is supported on an exterior surface of the transfer member. Said transfer member is rotated a number of rotations corresponding to the number of colors being transferred. A multi-color image is formed by overlaying on said sheet a toner of a different color on each single rotation. Methods for supporting a sheet on the aforesaid endless transfer member include charging the surface of the endless transfer member, so as to support a sheet on the surface of said endless transfer member via the force of electrostatic attraction.

However, such methods are disadvantageous inasmuch as suitably supporting a sheet on the transfer member cannot be accomplished when a stiff sheet, such as a thick paper sheet, overhead projector transparency (hereinafter referred to as "OHP sheet"), or the like, is supported on the aforesaid endless transfer member having a large curvature, inasmuch as the leading edge of the sheet separates from the surface of the endless transfer member and curls upward.

If a large diameter (i.e., small curvature) endless transfer member is used, stiff sheets can be suitably supported on the surface thereof. However, a large space is required to accommodate the installation of such an endless transfer member, thereby increasing the overall size of the apparatus itself.

SUMMARY OF THE INVENTION

An object of the present invention is to provide an image forming apparatus capable of suitably supporting a sheet on an endless transfer member without producing an upward curling of the sheet.

A further object of the present invention is to provide an image forming apparatus that is compact in size.

A still further object of the present invention is to provide an image forming apparatus capable of assuring excellent image quality.

According to one aspect of the present invention, an image forming apparatus for forming an image onto a sheet comprises:

an endless transfer member which is constructed to support said sheet thereon and to move in a transporting direction for transporting said sheet along an endless path;

a charger which is positioned in a vicinity of said endless transfer member for electrically charging said endless transfer member; and means for altering the electrostatic potential of said endless transfer member in said transporting direction so that a portion of said transfer member corresponding to a leading edge portion of said sheet has an electrical potential higher than that of the remaining portion of said endless transfer member.

These and other objects, advantages, and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the present invention are described hereinafter with reference to the accompanying drawings.

Figure 1:
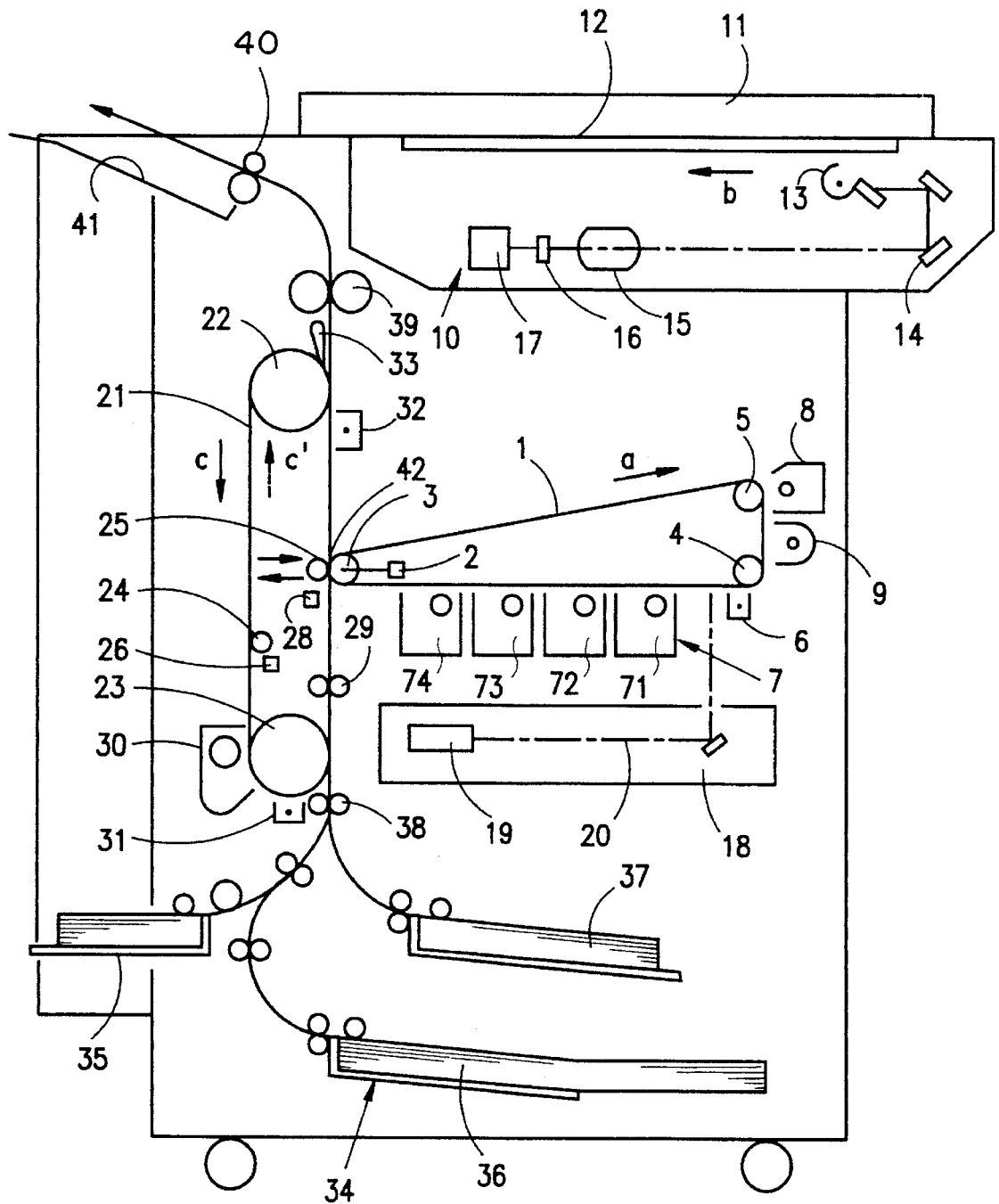
FIG. 1 is a section view briefly showing the construction of a multi-color copying apparatus.
Figure 2:
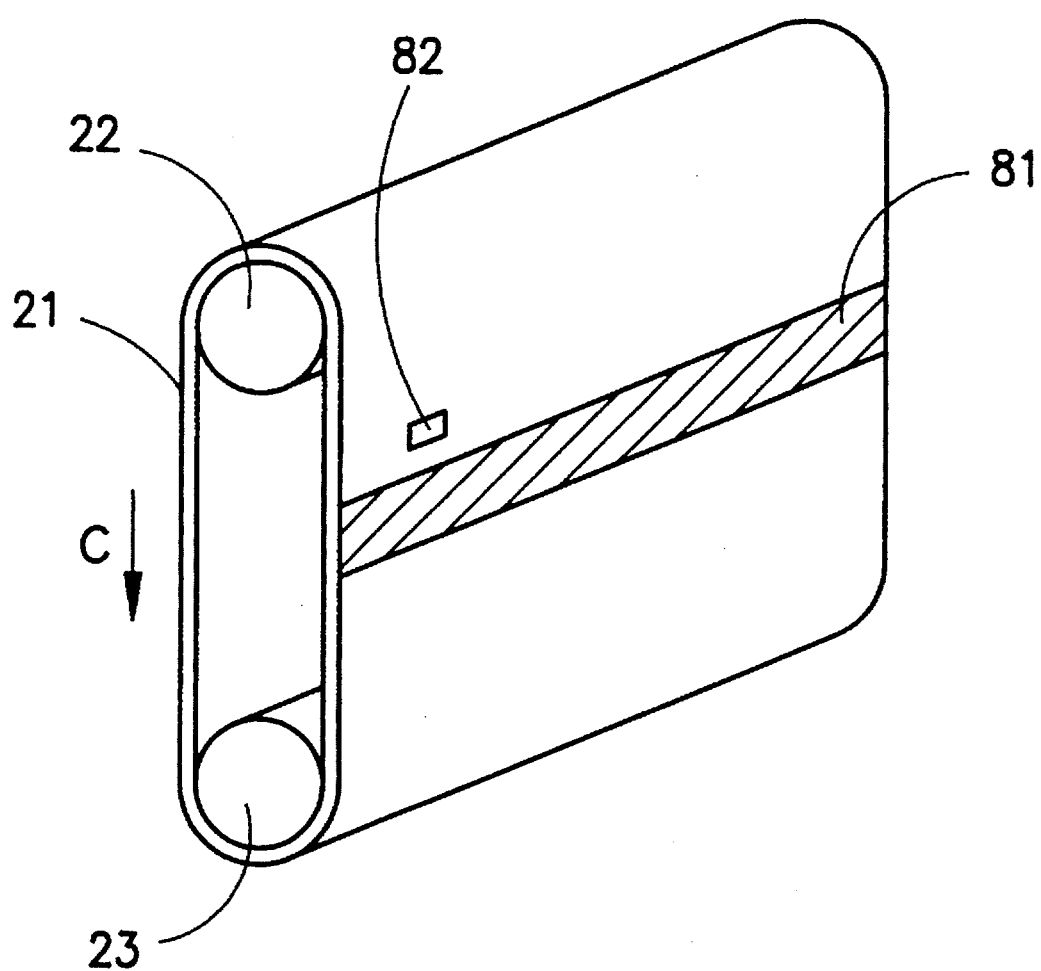
FIG. 2 is a perspective view showing a transfer belt (endless transfer member)

FIG. 1 is a section view briefly showing the construction of a multi-color copying apparatus; FIG. 2 is a perspective view showing the construction of a transfer belt 21. Photosensitive member 1 comprises an endless belt having a photosensitive layer provided on the exterior surface thereof, and which circumscribes rollers 3, 4, and 5. Said roller 3 is connected with a not shown drive motor and a rotation detection sensor 2 comprising a pulse encoder. The photosensitive member 1 is movable in the arrow [a] direction in accordance with the rotation of said roller 3. Arranged around the periphery of photosensitive member 1 are a charger 6, a developing unit 7, a cleaning device 8, and an eraser lamp 9. The developing unit 7 comprises four separate developing devices 71, 72, 73, 74, which respectively accommodate yellow, magenta, cyan, and black developers, and which are selectably switchable between a developing state and a non-developing state.

Image reader 10 is disposed below document platen 12 which is protected by an openable cover, said image reader 10 being constructed so as to move in the arrow [b] direction as document illumination lamp 13 illuminates a document (not shown in the drawings) disposed on document platen 12. Light reflected from an original document is read as color signals of the primary colors by line sensor 16 via mirror unit 14 and lens unit 15, said individual color signals being output to image processing circuit 17.

Image exposure unit 18 is provided with a laser emitting device 19, which emits a laser beam 20 based on the output from the aforesaid image processing circuit 17, said laser beam 20 exposes the exterior surface of photosensitive member 1 at a location between the charger 6 and the developing unit 7.

The endless transfer member, i.e., the transfer belt 21, circumscribes drive roller 22 and driven roller 23, which is disposed below said drive roller 22. The tension of said transfer belt 21 is adjustable via a tension roller 24. The transfer belt 21 is preferably a belt having a two-layer laminate construction comprising a conductive layer (150 μm thickness, $10^8$ Ω·cm volume resistivity) having carbon dispersed within a fluororesin, i.e., polyvinylidene fluoride (PVDF), over which is superimposed an insulative layer of PVDF (30 μm thickness, $10^{15}$ Ω·cm or greater volume resistivity), such that the insulative layer is on the exterior surface.

A transfer roller 25 is supported on the interior side of transfer belt 21 so as to be capable of advancing and retracting relative to the drive roller 3. The transfer belt 21 makes contact with and separates from the photosensitive member 1 via the advancement and retraction of the transfer roller 25. On the interior side of the transfer belt 21 are provided a position detection sensor 26 in the vicinity of the tension roller 24, and a sheet detection sensor 28 below the transfer roller 25. As can be clearly understood from FIG. 2, the transfer belt 21 is provided with a small aperture 82. The position detection sensor 26 and the sheet detection sensor 28 detect the position of the transfer belt 21 by detecting said small aperture 82.

The position detection sensor 26 preferably comprises a reflecting type photosensor comprising a light emitter and a light receptor. The photosensor 26 detects the presence of the small aperture 82 when it passes before the sensor 26 because of the difference in reflected light caused by the aperture 82.

Alternatively, instead of a reflecting type photosensor 26, a transmitting type photosensor may be used. In this case, the light receptor would be on an opposite side Of the transfer belt 21 than the light emitter when the aperture 82 passes between the light emitter and the light receptor, the light receptor receives light that is emitted from the light emitter and which passes through the aperture 82.

Alternatively, instead of an aperture 82 in the transfer belt 21, the transfer belt 21 may include a patch having a reflective character different than that of the remainder of the transfer belt 21 and the position detection sensor 26 could be a reflecting type photosensor. The patch may be constructed from insulating tape having a reflective character different from that of the surface of the transfer belt 21.

In yet another embodiment, a mechanical sensor, such as a microswitch, may be used to detect a protruding member on the surface of the transfer belt 21.

Figure 9:
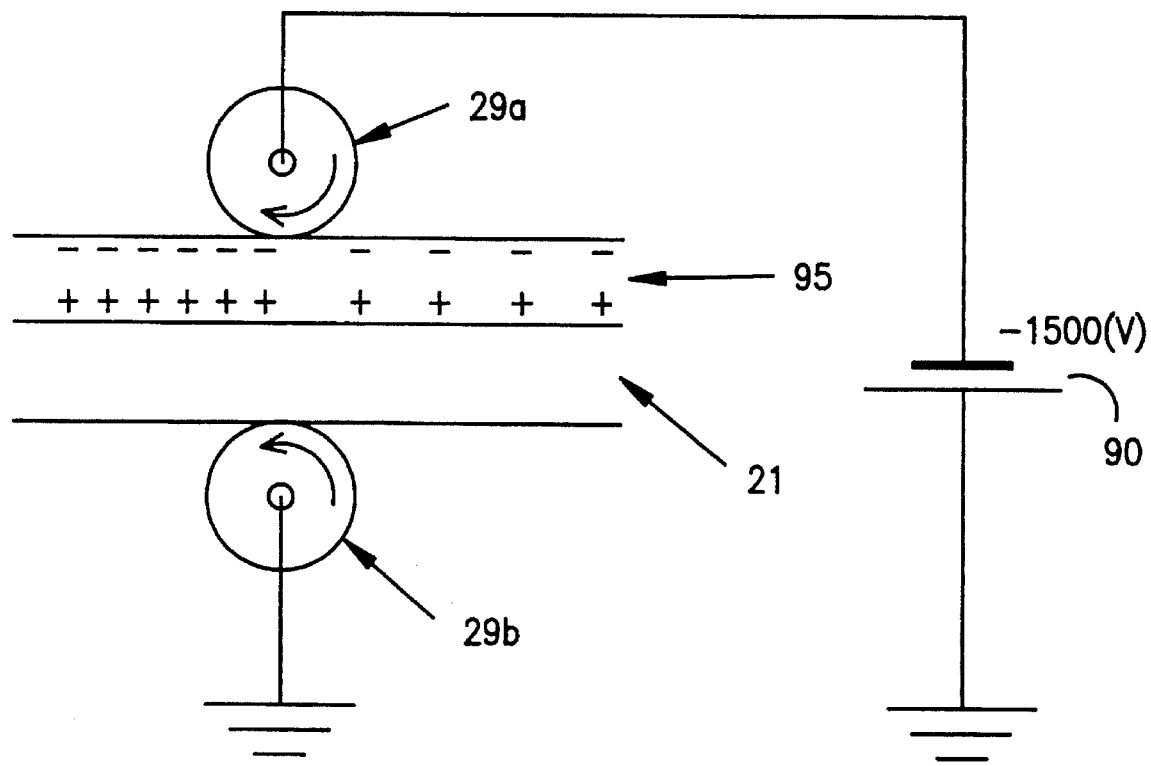
FIG. 9 is a schematic view of the assisting rollers.

Below the transfer roller 25 is provided a pair of assisting rollers 29 made of electrically conductive material such as metal or the like to press a sheet to the exterior surface of the transfer belt 21. Said assisting rollers 29 are connected to a bias power source. See FIG. 9.

The assisting roller 29a that is located externally of the transfer belt 21 is connected to a voltage supplying circuit 90. The assisting roller 29b that is located within the transfer belt 21 is grounded directly. Paper supplied to the transfer belt is contacted directly by the biased assisting roller 29a so the a negative charge is imparted to the paper from the voltage supplying circuit 90 via the assisting roller 29a. The charge imparted to the paper increases the attraction force between the paper and the transfer belt 21.

On the exterior side of the transfer belt 21 are provided a belt cleaner 30 and a charger 31 which confront the portion of the belt 21 wrapped around the driven roller 23, a discharger 32 which confronts the portion of the belt 21 passing the region confronting the photosensitive member 1, and a release member 33 for releasing the portion of the belt wrapped around the drive roller 22.

A paper feed unit 34 comprises paper supply sections 35, 36, and 37. The sheets accommodated in said paper supply sections 35, 36, and 37 may be selectively supplied. The selection of the aforesaid paper supply sections is accomplished via paper supply section selection switches (not illustrated) provided on an operation panel 103 (refer to FIG. 3). A sheet 95 fed from the paper supply sections 35, 36, and 37 is temporarily stopped when it makes contact with a timing roller 38, and the leading edge of the sheet is synchronized with the transfer belt 21 so as to be electrostatically adhered to region 81 thereon (refer to FIG. 2), and thereby be supplied to transfer belt 21. Region 81 of the transfer belt 21 is a region on which an electrostatic attraction force is generated that is greater than other regions on the belt 21.

A fixing device 39 and a discharge roller 40 are provided above the transfer belt 21. The toner image formed on a sheet is fixed thereon when said sheet passes the fixing device 39. The sheet is then discharged by the discharge roller 40 to a discharge tray 41.

OPERATION OF A PREFERRED EMBODIMENT

The general operation of the previously described multicolor copying apparatus is briefly described hereinafter. An original document (not illustrated) is placed on the document platen 12, and may be covered by placing a document cover 11 thereon. Then, when the print switch (not illustrated) provided on the operation panel 103 is switched ON, the document illumination lamp 13 in the image reader 10 illuminates the original document while traveling in the arrow [b] direction, the light reflected from the document impinges the line sensor 16 via the mirror unit 14 and the lens unit 15, and said light is read as color signals of three primary colors, i.e., blue, red, and green, by said line sensor 16. These color signals are converted to four value signals of yellow, magenta, cyan, and black, which are output to an image exposure unit 18.

In the image exposure unit 18, laser light 20 is emitted relative to a yellow image on the surface of the photosensitive member 1 in accordance with the previously described output signals. When completed, laser light 20 is emitted relative to a magenta image on the surface of the photosensitive member 1. When completed, laser light 20 is emitted relative to a cyan image on the surface of the photosensitive member 1. When completed, laser light 20 is emitted relative to a black image. The timing for emitting the aforesaid laser beams is described hereinafter.

The photosensitive member 1 moves in the arrow [a] direction based on the rotation of the roller 3, and the photosensitive layer on the exterior side of said photosensitive member 1 is charged to a predetermined electric potential at the portion thereof confronting the charger 6. The charged photosensitive member 1 is irradiated by the laser beam 20 emitted from the image exposure unit 18, such that a separate electrostatic latent image for each color is sequentially formed on the exterior surface of the photosensitive member 1. The electrostatic latent images corresponding to the respective colors are thereafter rendered visible by development as toner images via the developing devices 71, 72, 73, and 74 accommodating developers of corresponding colors.

The transfer belt 21 moves in the direction of the arrow [c] in accordance with the rotation of the drive roller 22 which is started via print switch ON signals, and after the surface is cleaned by the belt cleaner 30, said surface is charged to a predetermined electric potential by the charger 31. Control of this charging is described later. Furthermore, a predetermined voltage is supplied to the assisting rollers 29 via the power source 90. On the other hand, Sheets fed from the paper supply sections 35, 36, or 37 are transported past the timing roller 38 to the transfer belt 21, and are electrostatically adhered to the exterior surface of the transfer belt 21, and are reliably supported by passing medially through the pair of assisting rollers 29.

A sheet supported on the transfer belt 21 is transported in the direction indicated by arrow [c] in conjunction with the movement of the transfer belt 21, and when the small aperture on said transfer belt 21 is detected by the sensor 28, the transfer roller 25 is moved rightwardly in the drawing, so as to cause the transfer belt 21 to come into contact with the photosensitive member 1. The sheet is transported to a position at which the transfer roller 25 and the photosensitive member 1 make contact via transfer the belt 21 (hereinafter referred to as the "transfer position 42"), and a yellow toner image formed on the surface of the photosensitive member 1 is transferred onto said sheet. The sheet carrying the transferred yellow toner image is repeatedly transported to the transfer position 42 in conjunction with magenta, cyan, and black toner images and their respective timings, such that said respective toner images are sequentially superimposed one over another.

After the sheet carrying the transferred toner images of all the colors has been subjected to a weakening of the electrostatic attraction force by discharger 32, said sheet is separated from the transfer belt 21 by means of the separation member 33. After the toner image is thermally fused to said sheet by the fixing device 39, it is discharged to the discharge tray 41 by the discharge roller 40. On the other hand, the exterior surface of photosensitive member 1 from which the toner image was transferred at transfer position 42 is cleaned by the cleaning device 8, and thereafter the residual charge remaining on the surface of the photosensitive member 1 is eliminated by the eraser lamp 9.

Figure 3:
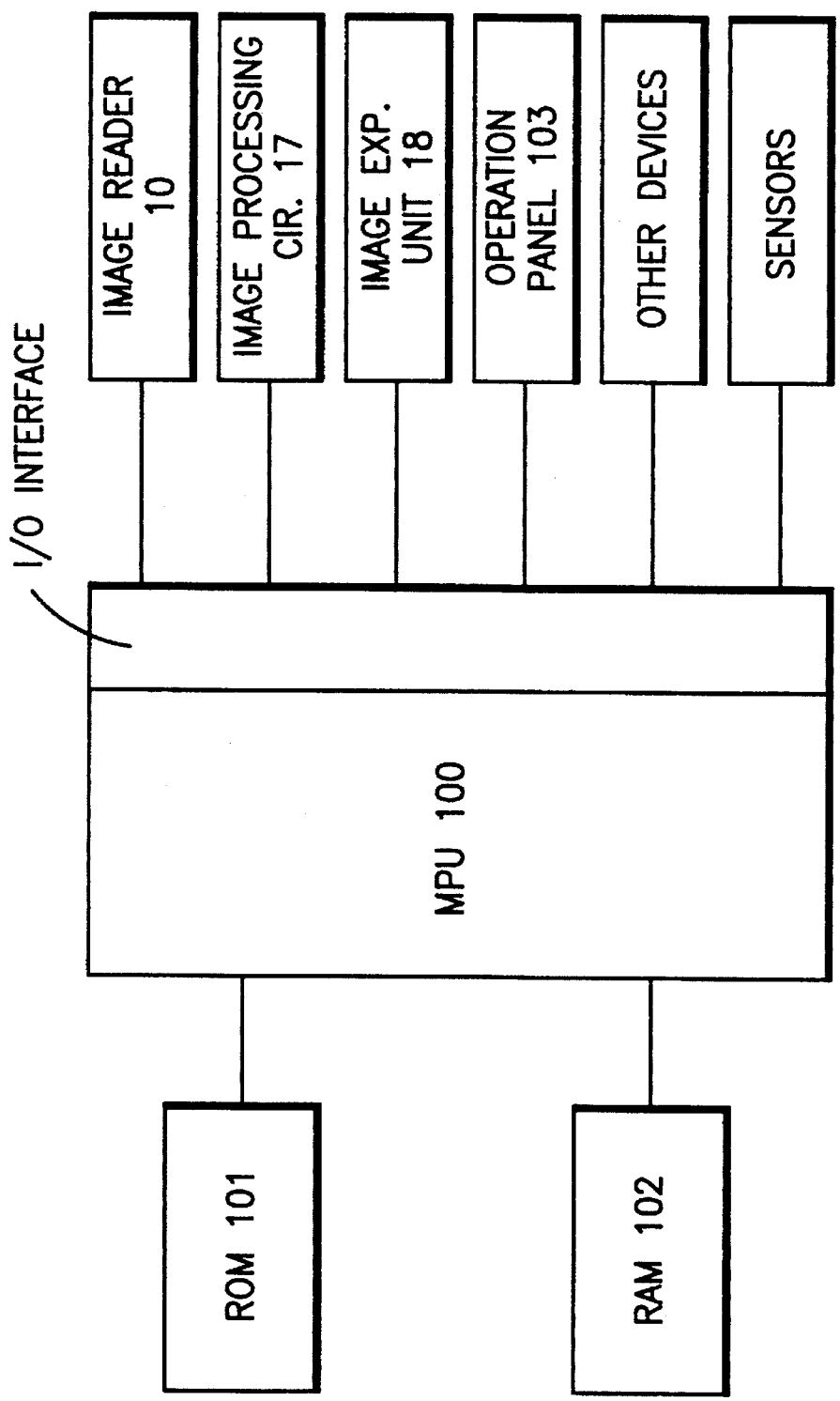
FIG. 3 is a block diagram showing the control circuit of the multi-color copying apparatus.

The multi-color copying apparatus of the previously described construction and operation is constructed such that the operation of the various components are controlled by microprocessors. FIG. 3 is a block diagram showing the control circuit of the multi-color copying apparatus of the present embodiment.

Microprocessor 100 (hereinafter referred to as "MPU 100") is provided with a read only memory (ROM) 101 which stores programs, and a random access memory (RAM) 102 which functions as a work area. The image reader 10, the image processing circuit 17, the image exposure device 18, the operation panel 103, and various other devices and types of sensors are connected to the input/output (I/O) interface of MPU 100. The aforesaid other devices include a motor (not illustrated) for the driving roller 3, the developing devices 71~74, a motor (not illustrated) for driving the drive roller 22, the fixing device 39 and the like. The aforesaid various types of sensors include the position detection sensor 26, the sheet detection sensor 28, a fixing device temperature sensor (not illustrated), and the like.

The control steps executed by MPU 100 are described hereinafter with reference to FIGS. 4~8.

Figure 4:
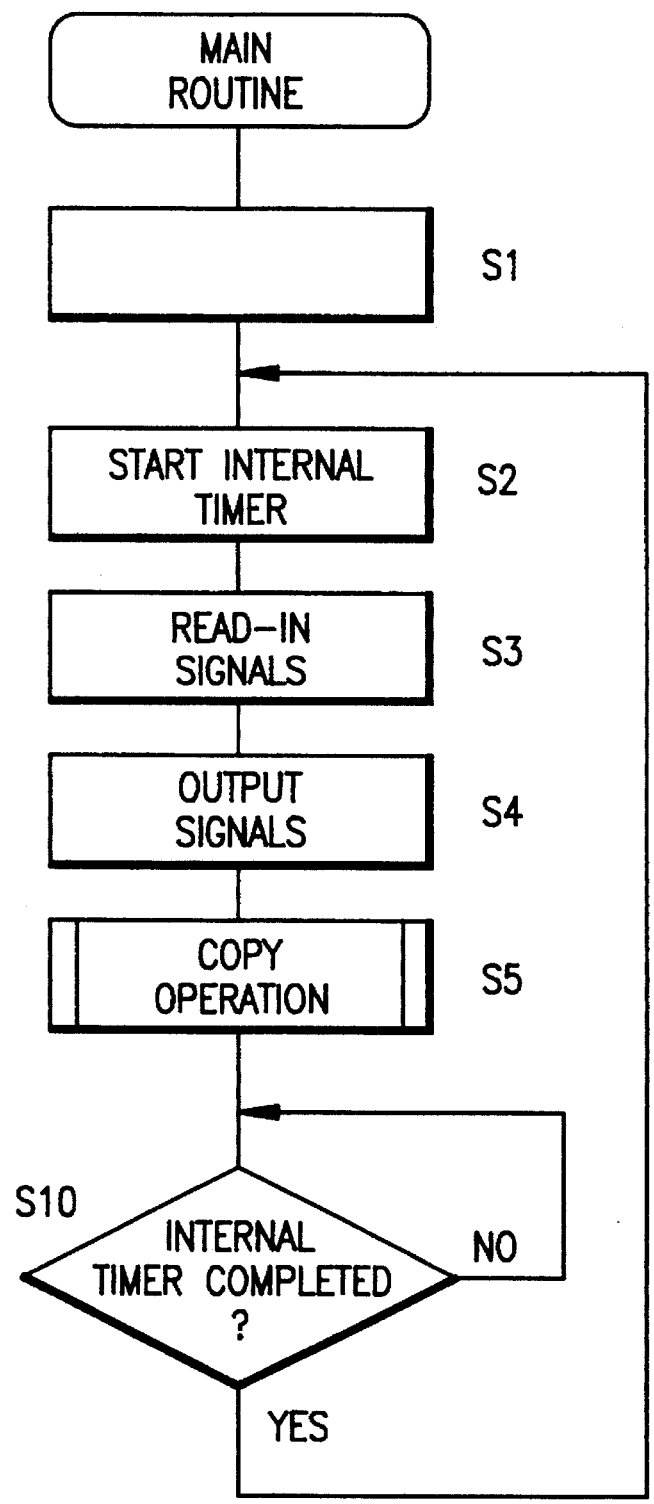
FIG. 4 is a main routine showing the control of the multi-color copying apparatus.

FIG. 4 is a main routine showing the contents of the steps of the multi-color copying apparatus. When MPU 100 is reset by activating a power source switch, or reset Switch (not shown in the drawings), the program starts, and in step S1, RAM is cleared and various registers are initialized. In step S2, internal timers are started. The internal timers determine the time period required to complete one routine, and the timer value is previously set by initialization in step S1. Then, in steps S3~S5, the various subroutines are called, and when said calls are completed, the completion of the internal timer is awaited in step S10, whereupon the program returns to step S2. In the subroutine of step S3, a process is executed to read-in the output signals from various types of switches and sensors; and in the subroutine of step S4, a process is executed to output various signals required to control the display elements (not illustrated) provided on the operation panel 103. In the subroutine of step S5, various process are executed relating to the copying operation. The copy operation processing of step S5 is described hereinafter.

Figure 5:
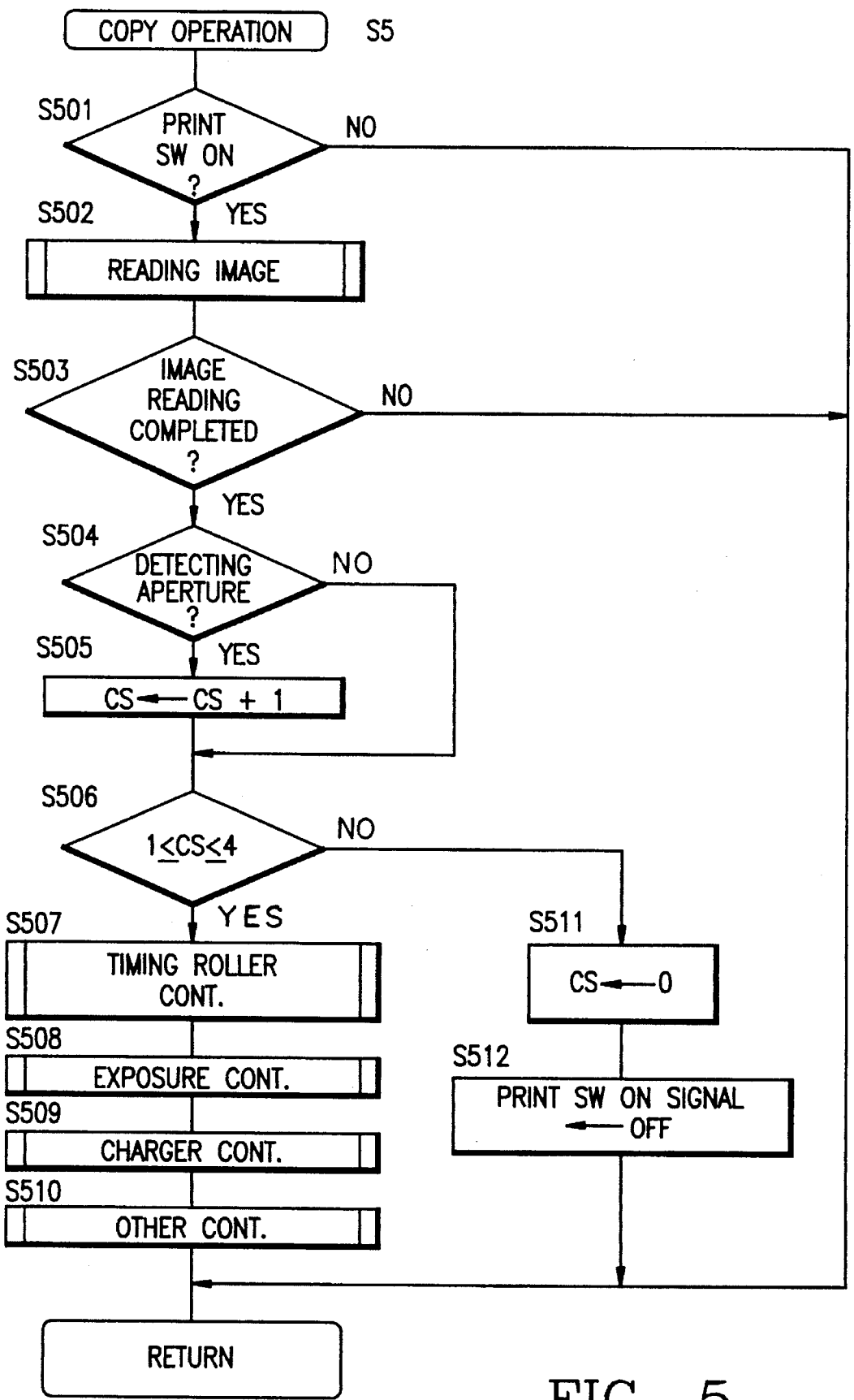
FIG. 5 is a subroutine showing the steps of the copy operation of step S5.

FIG. 5 is a flow chart showing the copy operation processing subroutine of step S5. In step S501, a check is made to determine whether or not the print switch (not illustrated) has been depressed. If the print switch has not been depressed, subsequent processes are not executed and the program returns to step S10 of the main routine. The print switch ON signal is maintained until it is reset in step S512, described later. When the print switch has been depressed, a subroutine of Reading Image is called, and the process for reading the image is started (step S502). Hence, the subroutine of Reading Image is executed only when the process for reading the image has not been started. If the process for reading the image has already been started, the subroutine of Reading Image is not executed, and the next step S503 is executed.

Then, the completion of reading the document image by image reader 10 is awaited (step S503), and a check is made to determine whether or not the position detection sensor 26 has detected the small aperture 82 on the transfer belt 21 (step S504). When the small aperture 82 is detected, color status CS is incremented S505. Color status CS expresses whether or not the image formation process for the present color has been executed, and is set at [0] at initialization. That is, color status CS increments each time transfer belt 21 completes one rotation. In the following description of the multi-color copying apparatus of the present embodiment, the timing of image formation timing of each color and the timing for transporting a sheet to the transfer belt 21 are controlled based on the aforesaid small aperture 82 detection timing.

In step S506, the set value of color status CS is checked. When the color status CS value is 1~4, the subroutines of steps S507~S510 are sequentially called, and when said calls are completed the subroutines are omitted and the program returns to step S10 of the main routine. In step S510, various operational controls, e.g., the actuation of the photosensitive member 1, the transfer belt 21, the charger 6, the developing unit 7, the cleaning device 8, and the eraser lamp 9, are executed in response to actuation of the print switch. For example, when color status CS is 4, a process to separate a sheet which has completed four color toner image transfers from the transfer belt 21, a process to transport the sheet separated from the transfer belt 21 to the fixing device 39, and a process to discharge the fixed sheet through the discharge roller 40 to discharge tray 41 are executed. On the other hand, when the color status CS set value is determined to be a value other than 1~4 in step S506, a process is executed to reset the color status CS value to [0] in step S511, and a process is executed to reset the print switch ON signal in step S512.

Figure 6:
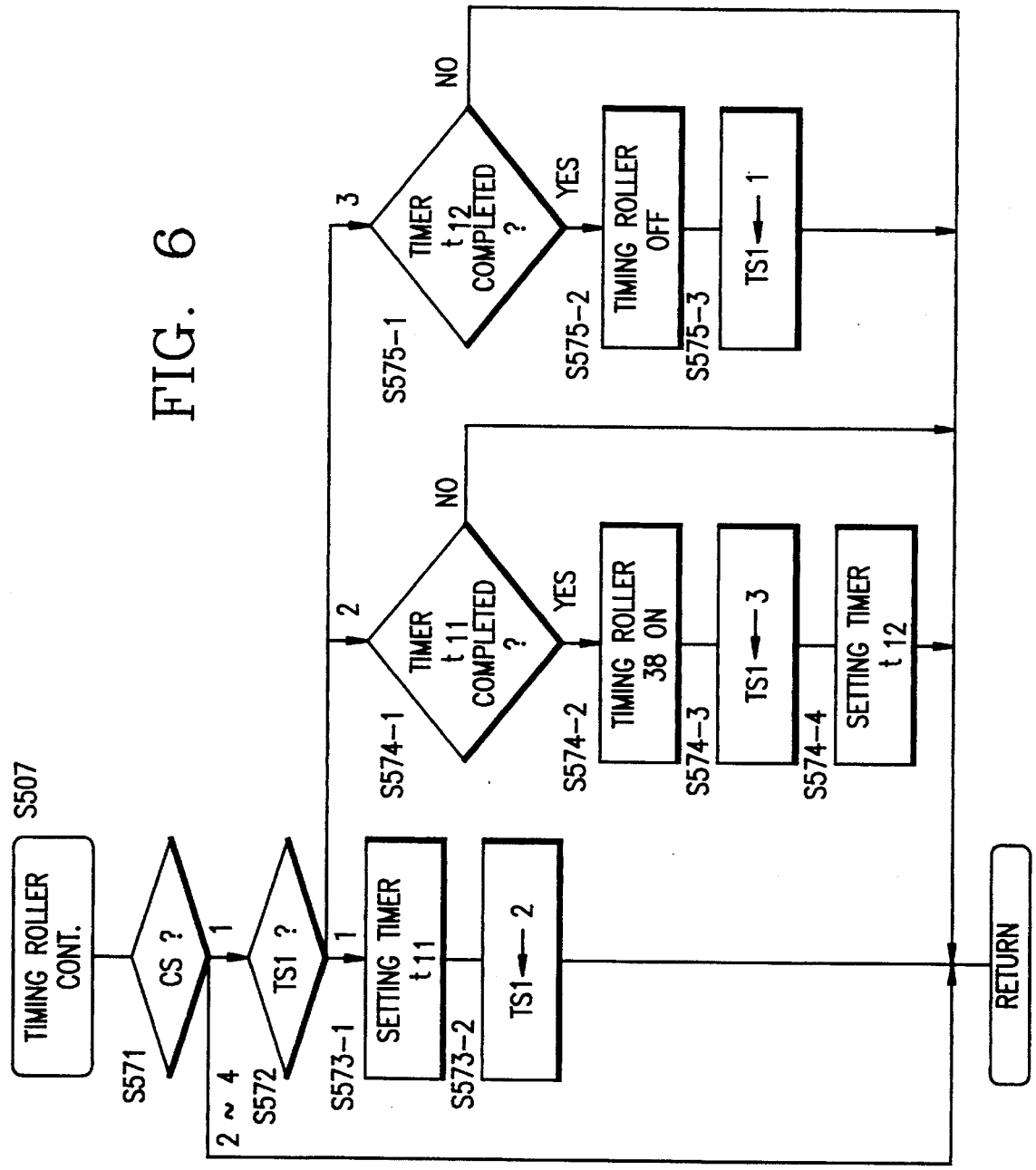
FIG. 6 is a subroutine showing the steps of the timing control of step S507.

FIG. 6 is a flow chart showing the timing roller control subroutine of step S507. The timing roller control subroutine is a process to synchronize the transfer belt 21 and the sheet fed from the paper supply sections 35, 36, and 37, i.e., a process necessary only when the color status CS value is [1]. Accordingly, when the color status CS set value is checked in step S571 and found to be a value other than [1], this subroutine is omitted. When the color status CS value is [1], timing status TS1 set value is checked in step S572, and processing is executed in accordance with said set value. Timing status TS1 is set at a value of [1] at initialization, and, thus, a process for timing status TS1=1 (steps S573-1, S573-2) is executed at first.

In the process executed when timing status TS1=1, timer t11 is set to synchronize the transfer belt 21 and the sheet. Then, timing status TS1 is incremented. The process for timing status TS1=1 is executed directly after the aforesaid color status CS value is set at [1]. In other words, setting of the timer t11 is accomplished in response to the detection of the small aperture 82 by the position detection sensor 26.

In the process for timing status TS1=2 (steps S574-1~S574-4), the completion of the timer t11 is awaited, whereupon the timing roller 38 is switched ON, timing status TS1 is incremented, and the timer t12 is set. Timer t12 counts the time for stopping the timing roller 38, and is sequentially set in accordance with the length of the sheet.

In the process for timing status TS1=3 (steps S575-1~S575-3), the completion of timer t12 is awaited, whereupon the timing roller 38 is switched OFF, and timing status TS1 is reset to the initialization value [1].

Figure 7:
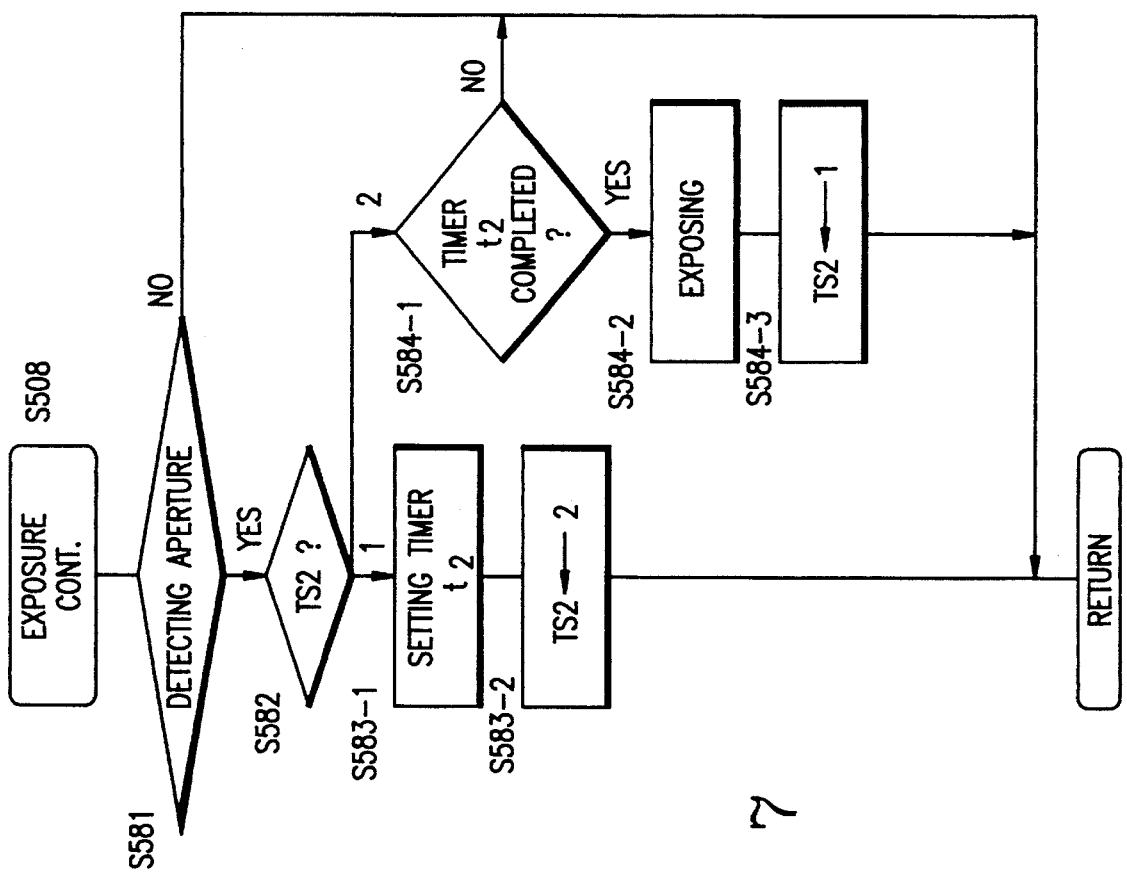
FIG. 7 is a subroutine showing the steps of exposure control of step S508.

FIG. 7 is a flow chart showing the exposure control steps of step S508. In the exposure control subroutine, the start of writing of the yellow, magenta, cyan, and black color electrostatic latent images on the photosensitive member 1 is synchronized with the transfer belt 21. Thus, in step S581, a check is made to determine whether or not the small aperture 82 has been detected by the position detection sensor 26. If the aperture 82 has not been detected, this subroutine is omitted. When the aperture 82 is detected, the set value of timing status TS2 is checked S582, and processing is executed in accordance with said set value. Timing status TS2 is set at [1] at initialization. Accordingly, the process for timing status TS2=1 (steps S583-1~S583-2) is executed at first.

In the process for timing status TS2=1, timer t2 is set, and timing status TS2 is incremented. Timer t2 is used to synchronize the latent image write timing on the photosensitive member 1 with the sheet on the transfer belt 21.

In the process for timing status TS2=2 (steps S584-1~S584-3), the completion of the timer t2 is awaited, whereupon the start of exposure is executed, and, thereafter, timing status TS2 is reset to [1]. In step S584-2, when color status CS is set at [1], exposure is started in accordance with yellow data, and similarly, exposure is started in accordance with magenta, cyan, and black data when color status CS is set at [2], [3], and [4], respectively.

Figure 8:
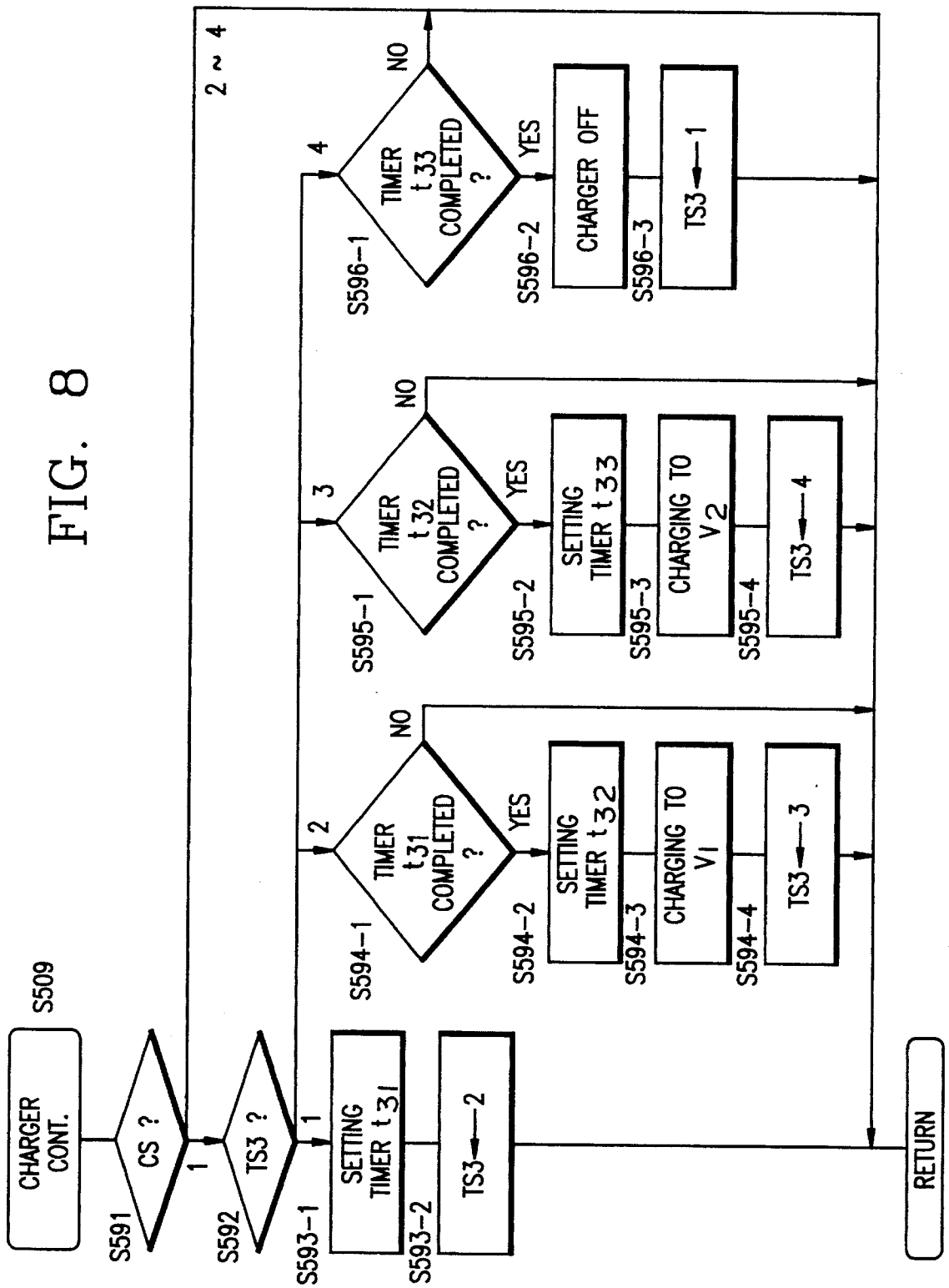
FIG. 8 is a subroutine showing the steps of transfer belt control of step S509.

FIG. 8 is a flow chart showing the transfer belt control of step S509. In this subroutine, processing is executed to charge the transfer belt 21, and support a sheet transported through the timing roller 38 on said transfer belt 21 via an electrostatic attraction force. That is, this process is necessary only when color status CS is set at [1]. A check is made in step S591 to determine whether or not color status CS is set at [1]. If color status CS is not set at [1], subsequent processing is not executed, and this subroutine ends.

When color status CS is set at [1], the set value of timing status TS3 is checked in step S592, and processing is executed in accordance with said set value. Timing status TS3 is set at [1] at initialization. Accordingly, processing for timing status TS3=1 (steps S593-1, S593-2) is executed at first.

In the process for timing status TS3=1, timer t31 is set to synchronize the sheet with the area of the transfer belt 21 to be charged by the charger 31, then, timing status TS3 is incremented.

In the process for timing status TS3=2 (steps S594-1~S594-4), the completion of timer t31 is awaited, whereupon timer t32 is set, charging to a charge potential V1 is started, and timing status TS3 is incremented.

In the process for timing status TS3=3 (steps S595-1~S595-4), the completion of timer t32 is awaited, whereupon timer t33 is set, charge potential is switched from V1 to V2, and timing status TS3 is incremented.

In the process for timing status TS3=4 (steps S596-1~S596-3), the completion of timer t33 is awaited, whereupon charger 31 is switched OFF, and timing status TS3 is reset.

The applied voltage V1 is preferably selected from a range of 2,600–4,100 volt, and the corresponding portion of the transfer belt 21, i.e., the region 81, is charged to a range of 2,400–3,800 volts. The applied voltage V2 is preferably selected from a range of 800–2,300 volts, and the corresponding portion of the transfer belt 21 is charged to a range of 600–2,000 volts. In this embodiment, the applied voltage V1 and V2 are selected to be 3,400 volts and 1,800 volts, respectively, and the corresponding portions of the transfer belt 21 are charged to 3,000 volts and 1,500 volts, respectively. Furthermore, a bias potential of −1,000 V is applied to the assisting roller 29 to reliably support a sheet fed to the transfer belt 21 on said transfer belt 21.

As the aforesaid description makes clear, the charger 31 charges the transfer belt 21 at high charging potential V1 only at uniform periods (during operation of timer t32), and thereafter timers t31 and t33 are set so as to charge the transfer belt 21 at low charging potential V2 (during operation of timer t33). Thus, the transfer belt 21 is charged at charging potential V1, thereby forming a region 81 having a strong electrostatic attractive force. On the other hand, the region charged at charging potential V2 generates a weaker electrostatic attraction force compared to the region 81. Accordingly, the leading edge portion of the sheet is attracted by a stronger electrostatic attraction force than that of other portions of the sheet. The leading edge of the sheet does not curl upward separating from the transfer belt 21 even while passing the curved portion of the rollers 22, 33, i.e, passing the area of large curvature. The adhesion of the sheet to the transfer belt 21 by a strong electrostatic attraction force produces a reduction of image quality, but in the present embodiment, this does not pose a significant disadvantage inasmuch as only the leading edge of the sheet is supported by said strong electrostatic attraction force, whereas the regions other than said leading edge are respectively supported by an electrostatic attraction force which does not produce a reduction of image quality.

Although the operation of the present embodiment has been described in terms of a single sheet being supported on the transfer belt 21, it is possible to support a plurality of sheets simultaneously on the transfer belt 21. In this instance, the region 81 having a strong electrostatic attraction force may be formed at a plurality of locations.

Rather than controlling the output of the charger 31 as previously described, another possible means for altering the electrostatic attraction force of the leading edge of the sheet so as to be greater than the electrostatic attraction force of other regions is to control the bias potential of the assisting rollers 29 while the output of the charger 31 remains constant. Specifically, charger 31 may supply a constant electric potential of 3,400 V, the assisting roller 29 may supply a potential of −1,000 V when confronting the region 81, and a potential of 0 V (zero volts) when confronting other regions of the transfer belt 21.

Another effective means for strengthening the electrostatic attraction force of the leading edge of the sheet so as to be greater than the electrostatic attraction force of other regions is to increase the thickness of the insulative layer of the transfer belt 21 only at the portion corresponding to the region 81. Increasing the thickness-of the insulation layer is believed to improve the dielectric constant of the region 81. In the aforesaid transfer belt 21, the electrostatic attraction force of the region 81 may be strengthened without controlling the charger 31 and the assisting roller 29 as previously described.

In this last embodiment, wherein the thickness of the transfer belt 21 is thickened at region 81 to increase the charge accumulated at that point, the belt 21 may be thickened by applying an insulative tape at region 81. The tape could then have the dual function of thickening the transfer belt 21 and also functioning as having a different reflective characteristic than the remainder of the belt 21. Thus, the tape can be detected by a reflecting type photosensor instead of an aperture 82.

Yet another embodiment of the present invention includes moving the transfer belt 21 at a reduced velocity only when the region 81 is being charged. Since the transfer belt 21 acts as a condenser, the charged potential of the transfer belt 21 is proportional to the charging period until the transfer belt 21 reaches its full charging potential. Thus, slowing the velocity of the belt 21 increases the charging period, thus increasing the charge on the transfer belt 21. By slowing the velocity of the transfer belt 21 only when the region 81 is being charged, the region 81 is charged to a higher level than the remainder of the transfer belt 21.

Furthermore, the location of the region 81 may be switchable in accordance with the number and size of sheets supported on the transfer belt 21. In this instance, the region 81 would be formed by controlling the bias supplied to the charger 31 and the assisting roller 29 as previously described.

Further, the aforesaid charging potential may be controlled only when a stiff sheet is used.

In the present embodiment means for providing a portion of the surface of the transfer member having a stronger electrostatic attraction force than other regions of the surface of said transfer member may include:

(1) increasing the output of the charger 31 only for a uniform period of time (short period);

(2) changing the bias voltage output to the pair of assisting rollers 29 only for a uniform period of time (short period);

(3) increasing the thickness of only a portion of the insulative layer of the transfer belt; and (4) reducing the velocity of the transfer belt 21 while the region 81 is being charged so that the region 81 is charged to a greater extent than the remainder of the transfer belt 21.

It is to be noted that other means may also be considered such as, for example, adhering an insulative tape, e.g., commercially available tape made of polyethylene terephthalate (PET), polyimide, or tetrafluoroethylene (all having a volume resistivity of $10^{15}$ Ω·cm or greater), on the region 81. Such means, i.e., adhering insulative tape, is believed to produce an effect similar to increasing the thickness of the insulative layer of transfer belt 21.

In this embodiment, the insulative tape is also used for the patch which is detected by the reflective type photosensor for detecting the position of the transfer belt 21, if the insulative tape has a reflective character different from that of the transfer belt 21.

As the preceding description makes clear, the image forming apparatus of the previously described embodiment does not produce upward curling of a sheet when the endless type transfer member has an area of large curvature because the electrostatic attractive force of the leading edge portion of said sheet is greater than the electrostatic attraction force of the latter portion of said sheet. Accordingly, the actual shape of the endless type transfer member may be freely determined, thereby allowing more effective use of space within the image forming apparatus, and further rendering said apparatus more compact.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus for forming an image onto a sheet, comprising:

a sheet supporting member;

a charger which is positioned in a vicinity of said sheet supporting member; and means for controlling the charger so that the charger charges a specific portion of said sheet supporting member corresponding to a leading edge portion of said sheet to an electrostatic potential higher than that of a remaining portion of said sheet supporting member, said electrostatic potential of said remaining portion being low enough to prevent a reduction of image quality.

2. The image forming apparatus as claimed in claim 1, wherein said controlling means controls a voltage applied to said charger.

3. The image forming apparatus as claimed in claim 1, further comprising:

a feeder which feeds a sheet to said sheet supporting member; and a controller which controls said feeder so as to feed a leading edge portion of said sheet to said specific portion of said sheet supporting member.

4. The image forming apparatus as claimed in claim 1, wherein said Sheet supporting member comprises an endless belt.

5. The image forming apparatus as claimed in claim 1, wherein said sheet supporting member transports said sheet a plurality of rounds.

6. The image forming apparatus as claimed in claim 1, further comprising:

an image carrying member which is faced to said sheet supporting member at a transferring position and movable in a same direction as said sheet supporting member at said transferring position;

an image forming mechanism which forms a plurality of images on said image carrying member;

wherein said plurality of images are transferred onto said sheet supported on said sheet supporting member at said transferring position one by one.

7. The image forming apparatus as claimed in claim 6, wherein said image forming mechanism includes a plurality of developing devices each of which contains a different color toner.

8. An image forming apparatus for forming an image onto a sheet, comprising:

an endless sheet supporting member which is constructed to support said sheet thereon and to move in a transporting direction for transporting said sheet along an endless path;

a charger which is positioned in a vicinity of said sheet supporting member for electrically charging said sheet supporting member so that said sheet is supported on said sheet supporting member by an electrostatic force; and altering means for altering an electrostatic potential of said sheet supporting member in said transporting direction so that a specific portion of said sheet supporting member corresponding to a leading edge portion of said sheet has an electrostatic potential higher than that of a remainder of said endless sheet supporting member, said electrostatic potential of said remainder being low enough to prevent a reduction of image quality.

9. The image forming apparatus as claimed in claim 8, wherein said altering means controls a voltage applied to said charger.

10. The image forming apparatus as claimed in claim 8, wherein said altering means comprises modifying means for causing said specific portion of said sheet supporting member to have a thickness thicker than that of the remainder.

11. The image forming apparatus as claimed in claim 10, wherein said modifying means is an insulating resin film adhered on said specific portion.

12. The image forming apparatus as claimed in claim 8, further comprising:

a feeder which feeds a sheet to said sheet supporting member; and a controller which controls said feeder so as to feed the leading edge portion of said sheet to said specific portion of said sheet supporting member.

13. The image forming apparatus as claimed in claim 8, wherein said sheet supporting member comprises an endless belt.

14. The image forming apparatus as claimed in claim 8, wherein said sheet supporting member transports said sheet a plurality of rounds.

15. The image forming apparatus as claimed in claim 8, further comprising:

an image carrying member which is faced to said sheet supporting member at a transferring position and movable in a direction same as said transporting direction at said transferring position;

an image forming mechanism which forms a plurality of images on said image carrying member, wherein said plurality of images are transferred onto said sheet Supported on said sheet supporting member at said transferring position one by one.

16. The image forming apparatus as claimed in claim 8, wherein said image forming mechanism includes a plurality of developing devices each of which contains different color toner.

17. The image forming apparatus as claimed in claim 8, wherein said sheet supporting member has a conductive layer and an insulative layer which is positioned at an exterior side.

18. An image forming apparatus for forming an image onto a sheet, comprising:

an endless sheet supporting member which is constructed to support said sheet thereon and to move for transporting said sheet along an endless path;

a feeder which feeds said sheet to said sheet supporting member;

a charger which is positioned in a vicinity of said sheet supporting member for electrically charging said sheet supporting member so that the sheet fed by said feeder is supported on said sheet supporting member by electrostatic force; and a controller which alters a voltage applied to said charger from a first level to a second level lower than said first level when said charger charges an area of said sheet supporting member where the sheet fed by said feeder is to be supported, a portion of said sheet supporting member charged with said second level being charged to a potential which is low enough to prevent a reduction of image quality.

19. The image forming apparatus as claimed in claim 18, wherein a portion of said sheet supporting member which is charged with the voltage of said first level has a potential in a range of 2400 to 3800 volt, and a portion of said sheet supporting member which is charged with said second level has a potential in a range of 600 to 2000 volt.

20. An image forming apparatus for forming an image onto a sheet, comprising:

an endless sheet supporting member which is constructed to Support said sheet thereon and to move for transporting said sheet along an endless path, a specific portion of said sheet supporting member having a thickness thicker than that of the other portion of said sheet supporting member;

a feeder which feeds said sheet to said sheet supporting member;

a charger which is positioned in the vicinity of said sheet supporting member for electrically charging said sheet supporting member so that the sheet fed by said feeder is supported on said sheet supporting member by electrostatic force; and a controller which controls a feeding timing of said sheet by said feeder so that a leading edge of the sheet matches said specific portion of said sheet supporting member.

21. The image forming apparatus as claimed in claim 20, wherein said specific portion of said sheet supporting member is thickened by adhering a insulative resin film thereon.

22. The image forming apparatus as claimed in claim 21, wherein said insulative resin film is made by a material selected from the group consisting of polyethylene terephthalate, polyimide and tetrafluoroethylene.

23. The image forming apparatus as claimed in claim 21, wherein said insulative resin film has a volume resistivity of $10^{15}$ Ω·cm or greater.

24. The image forming apparatus as claimed in claim 20, wherein said sheet supporting member has an insulative layer, a portion of the insulative layer for said specific portion of having a thickness thicker than that of other portion.

25. An image forming apparatus for forming an image onto a sheet, comprising:

an endless sheet supporting member which is constructed to support said sheet thereon and to move in a transporting direction for transporting said sheet along an endless path;

a charger which is positioned in a vicinity of said sheet supporting member for electrically charging said sheet supporting member so that said sheet is supported on said sheet supporting member by electrostatic force;

a voltage supplying means for imparting a charge to said sheet; and altering means for altering a potential of said voltage supplying means so that a leading edge portion of said sheet has an electrostatic potential higher than that of a remainder of said sheet, the electrostatic potential of the remainder being low enough to prevent a reduction of image quality.

26. The image forming apparatus as claimed in claim 25, wherein said sheet supporting member comprises an endless belt.

27. The image forming apparatus as claimed in claim 25, wherein said sheet supporting member transports said sheet a plurality of rounds.

28. The image forming apparatus as claimed in claim 25, wherein said image forming apparatus includes a plurality of developing devices each of which contains different color toner.

29. The image forming apparatus as claimed in claim 25, wherein said sheet supporting member has a conductive layer and an insulative layer which is positioned at an exterior side.

30. A method of adhering a sheet to a sheet supporting member during an image process, comprising the steps of:

charging a specific portion of the sheet supporting member corresponding to a leading edge portion of the sheet to a first electrostatics potential;

charging a remaining portion of the sheet supporting member to a second electrostatic potential that is lower than said first electrostatic potential and is low enough to prevent a reduction of image quality; and delivering the sheet to the sheet supporting member so that a leading edge portion of the sheet is aligned with the specific portion of the sheet supporting member.

31. The method of claim 30, further comprising the step of marking the specific portion of the sheet supporting member and identifying the marking with a sensor.

32. A sheet supporting device for supporting a sheet by electrostatic attraction force, said sheet supporting device comprising a sheet supporting member on which the sheet is supported, said sheet supporting member having a first portion corresponding to a leading edge portion of the sheet and a second portion corresponding to a remaining portion of the sheet, said first portion having a dielectric constant higher than that of said second portion.

33. A sheet supporting device as claimed in claim 32, wherein an insulative resin film is adhered at said first portion.

34. A sheet supporting device as claimed in claim 32, wherein said first portion has a thickness thicker than that of the second portion.

35. A sheet supporting device as claimed in claim 32, wherein said sheet supporting member is an endless belt.

36. A sheet supporting device for supporting a sheet by an electrostatic attraction force, said sheet supporting device comprising a sheet supporting member on which the sheet is supported, said sheet supporting member having a first portion corresponding to a leading edge portion of the sheet and a second portion corresponding to a remaining portion of the sheet, said first portion having an electrostatic capacity larger than that of said second portion.

37. A sheet supporting device as claimed in claim 36, wherein an insulative resin film is adhered at the first portion.

38. A sheet supporting device as claimed in claim 36, wherein said first portion has a thickness thicker than that of said second portion.

39. A sheet supporting device as claimed in claim 36, wherein said sheet supporting member is an endless belt.

40. An image forming apparatus for forming an image onto a sheet, comprising:

a sheet supporting member which has a conductive layer and an insulative layer;

a charger which is positioned facing said insulative layer; and means for controlling the charger so that the charger charges a specific portion of said sheet supporting member corresponding to a leading edge portion of said sheet to an electrostatic potential higher than that of a remaining portion of said sheet supporting member.

41. An image forming apparatus for forming an image onto a sheet comprising:

a sheet supporting member which has a conductive layer and an insulative layer;

a charger which is positioned facing said insulative layer; and means for controlling the charger so that the charger charges a specific portion of said sheet supporting member corresponding to a leading edge portion of said sheet to an electrostatic potential in a range of 2400 to 3800 volts, and charges a remaining portion of said sheet supporting member to an electrostatic potential in a range of 600 to 2000 volts.

42. An image forming apparatus for forming an image onto a sheet, comprising:

a sheet supporting member;

a charger which is positioned in a vicinity of said sheet supporting member; and means for controlling the charger so that the charger charges a specific portion of said sheet supporting member corresponding to a leading edge portion of said sheet to an electrostatic potential higher than that of a remaining portion of said sheet supporting member, said electrostatic potential of said specific portion being high enough to prevent a curling of the sheet from said sheet supporting member.

\* \* \* \* \*